Patented May 13, 1947

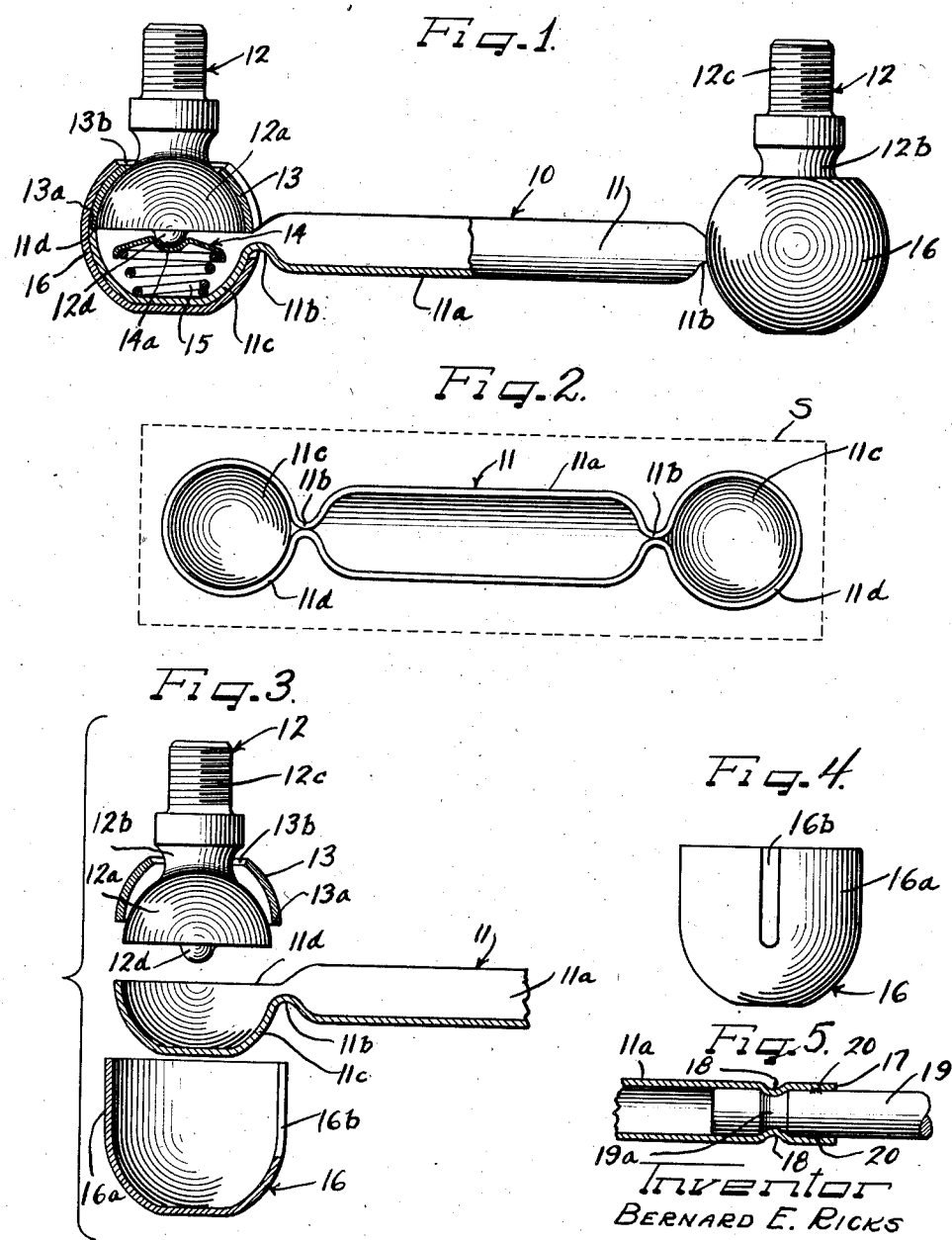

2,420,621

UNITED STATES PATENT OFFICE 2,420,621

SOCKET ASSEMBLY

Bernard E. Ricks, Detroit, Mich., assignor to Thompson Products, Inc., Cleveland, Ohio, a corporation of Ohio Application December 2, 1944, Serial No. 566,376

7 Claims. (Cl. 287—90)

1

This invention relates to socket assemblies or joints which are inexpensively produced from sheet metal stock and can be readily assembled by simple clinching or spinning operations.

Specifically, the invention deals with links or the like having ball studs at the ends thereof and formed from stamped sheet metal to provide permanent joint housings.

According to this invention, sheet metal is stamped to form cup-shaped housings at the ends thereof connected by an arm or shank of U-shaped cross section. Reduced neck portions are formed between the housings and arm to close the housings. Bearing members, formed by coining sheet metal into the shape of fragmental spherical rings, are bottomed on the open tops or rims of the cup-shaped housings. Studs having fragmental ball ends mounted in the bearing rings and shanks projecting freely through the apertures of the rings have the ball ends thereof maintained in good bearing relationship with the rings by spring-pressed retainers or spring seats acting on the stud heads. Shells embrace the cup-shaped housings and each has a slot receiving the reduced neck of the housing so that the open end of the shell can surround the bearing ring. This surrounding portion of the bearing ring is clinched or spun over the shell to form a retaining means permanently connecting the bearing ring and housing in opposed relationship thus forming a socket for the stud.

Instead of forming two housings and a connecting link arm from one piece of metal, separate stamped housings can be formed and connected together or to any other member through a rod or the like to provide a link assembly.

A feature of the invention resides in the provision of socket assemblies wherein all of the housing parts are composed of stamped sheet metal.

Another feature of the invention resides in the use of a bearing ring or seat member in opposed relationship to a cup-shaped housing and connecting the bearing ring or seat member to the housing for completing the assembly by means of an embracing shell.

It is, then, an object of this invention to provide a socket or joint assembly wherein the housing parts are composed of stamped sheet metal members in which the sheet metal parts are held together by an embracing stamped sheet metal shell.

A further object of the invention is to provide a link useful for shock absorber mountings and the like wherein the link member is composed of a stamped sheet metal part having cup-shaped ends joined through an intermediate U-shaped shank and wherein each cup end has a bearing ring retained thereon with a shell that embraces the cup and is clinched around the bearing ring to cooperate with the cup in forming a housing.

A still further object of the invention is to provide a socket assembly composed of opposed segmental socket members surrounded by a shell that is spun over the members to retain the same in opposed relationship.

A further object of the invention is to provide a ball and socket joint wherein the socket is composed of opposed semi-socket members held together by an embracing shell spun over one of the socket members.

A specific object of the invention is to provide links composed of stamped sheet metal and having cup-shaped housings at the ends thereof joined to a connecting shank through reduced neck portions, together with fragmental spherical bearing rings bottomed on the open ends of the housing and held thereon by means of shells embracing the housings and bearing rings and having slots receiving the reduced necks.

Other and further objects of the invention will be apparent to those skilled in the art from the following detailed descriptions of the annexed sheet of drawings which, by way of preferred examples only, illustrates two embodiments of the invention.

On the drawings:

Figure 1 is a side elevational view of the socket assembly or link according to this invention, with parts broken away and shown in vertical cross section, to illustrate underlying parts.

Figure 2 is a plan view of the link housing illustrating the manner in which it can be stamped from sheet metal.

Figure 3 is an exploded vertical cross-sectional view, with parts in side elevation, of one end of the link shown in Figure 1.

Figure 4 is an elevational view of the shell member for joining the link housing parts.

Figure 5 is a fragmentary vertical cross-sectional view, with parts in plan, illustrating an alternative link arrangement wherein the link shank is connected to a rod.

As shown on the drawings:

In Figure 1 the reference numeral 10 designates generally a link of this invention composed of a link member 11 carrying studs 12, 12 in the opposite ends thereof.

The member 11 has a U-shaped connecting shank portion 11a with a bottom web and spaced opposed upstanding side walls. The side walls of the U-shaped shank portion converge at the ends of the shank to form reduced necks 11b as better shown in Figure 2. The ends of the member 11 are cup-shaped housing portions 11c. These cup-shaped housings 11c have flat annular rims 11d around the open tops thereof.

As indicated in Figure 2, the member 11 can be formed by stamping flat sheet metal stock S, since the various portions are arranged so that they can be readily removed from stamping dies.

Metal bearing rings 13, conveniently formed from sheet metal by stamping or coining operations, have semi-spherical shapes with flat large diameter rim ends 13a, and opposed upstanding small diameter rim ends 13b defining the reduced openings. The rim ends 13a are bottomed on the rims 11d of the housings 11c.

The studs 12 each have a half-ball end 12a receiving a bearing ring 13 therearound together with a shank portion 12b projecting through the reduced opening 13b of the bearing ring. A threaded end portion 12c is provided on the stud shank for connecting the stud to a shock absorber arm (not shown) or the like. The half-ball end 12a has a flat bottom with a rounded protuberance 12d projecting from the central portion thereof.

A spring retainer or spring seat 14 has a rounded depression 14a receiving the protuberance 12d of the stud in tiltable and rotatable relation therein. A coil spring 15 is bottomed on the closed bottom of the cup-shaped housing 11c and acts on the retainer 14 to urge the stud head 12a into constant bearing engagement with the bearing ring 13.

Cup-shaped shell members 16 have closed bottom ends surrounding the housings 11c on each end of the member 11 together with initially upstanding cylindrical wall portions 16a containing slots 16b extending from the open tops thereof to the rounded closed bottoms thereof. These slots 16b are adapted to receive the reduced-diameter necks 11b of the member 11 so that the initially cylindrical portions 16a of the shells then surround the bearing rings 13. These portions 16a of the shells are clinched or spun into the contour of the bearing rings for holding the bearing rings and the housings 11c together. Thus ball-shaped housings are formed on the member 11.

Instead of forming the member 11 with housings 11c on both ends thereof, the shank portion of the member can be formed with an open U-shaped end, for receiving a connecting rod, tube, or the like insert member as shown in Figure 5. In Figure 5, the shank 11a has the upstanding side walls terminating at 17 without being converged. However, these side walls are preferably indented as at 18, 18 adjacent the end 17. A rod 19 having a groove 19a therearound adjacent the end thereof is seated in the shank 11a with the groove 19a receiving the indented portions 18. The rod is then preferably spot-welded as at 20 to the shank portion 11a.

From the above descriptions it will be understood that the socket assemblies or links of this invention have the housing parts composed of stamped sheet metal members which are inexpensively formed from inexpensive materials without the aid of lathe-turning or other machining operations. The sockets are formed from opposed semi-ball members held together in abutting relationship by an embracing cup or shell which is spun or clinched inwardly around its open end so that it forms a ball-shaped member. The studs can be conveniently formed by machining or upsetting operations and have half-ball heads tiltable and rotatable in the sockets on bearing rings which are held in position by the shell. Wear take-up springs urge the heads of the studs into good bearing relationship with the bearing rings. The links preferably have intermediate connecting shanks of U-shaped cross section to rigidify the sheet metal without requiring lathe-turning or machining operations. These U-shaped shanks have the side walls thereof pinched together at the socket ends of the members to provide reduced neck portions and to seal off the socket ends from the shanks.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A socket assembly comprising a cup-shaped housing, a shank projecting laterally from said housing, a bearing ring bottomed on the open end of the housing, a stud having a head seated on said bearing ring and a shank projecting through said ring, a shell embracing the cup-shaped housing and bearing ring and clinched around the bearing ring to retain the bearing ring and housing in assembled relation, and a spring-pressed retainer in said housing acting on said stud for urging the stud head into good bearing relation with the bearing ring.

2. A socket assembly comprising a stamped sheet metal member having a shank portion of U-shaped cross section, a reduced neck portion having the side walls of the shank portion in abutting relation, and an annular cup-shaped end housing, a stamped sheet metal bearing ring of fragmental spherical contour having the large end thereof bottomed on the open end of the cup-shaped housing, a stud having a fragmental spherical head in bearing engagement in said bearing ring, and a cup-shaped metal shell embracing said cup-shaped housing and having a slot therein receiving said reduced neck portion together with an end portion clinched over said bearing ring to retain the bearing ring in assembled relation relative to the housing for cooperating therewith to form a socket.

3. A joint construction comprising a cup-shaped housing having a flat annular rim end and a projecting shank portion, a bearing ring having a rim end bottomed on the rim of said cup-shaped portion and cooperating with said portion to form a socket, a stud mounted for limited universal movement in said socket and having a shank projecting from said bearing ring, and a shell member embracing said housing and said bearing ring and having a slot receiving said shank portion and being clinched inwardly around the bearing ring to retain the bearing ring in abutting relation to the housing.

4. A link comprising a stamped sheet metal body member having an intermediate connecting portion of U-shaped configuration with side walls converging at the ends thereof to provide reduced neck portions and then diverging to form cup-shaped ends, bearing rings bottomed on said cup-shaped ends, shells embracing the cup-shaped ends and said bearing rings and having slots receiving the reduced neck portions therein, and joint studs mounted for universal movement in the sockets defined by the bearing rings and cup-shaped ends.

5. A link assembly comprising a stamped sheet metal member having a shank portion with upstanding spaced opposed side walls and a connecting transverse wall, said side walls converging near the ends of said member to form reduced neck portions and said member having enlarged annular cup-shaped ends, bearing rings bottomed on said cup shaped ends, stud members having fragmental spherical heads tiltably and rotatably mounted on said bearing rings, and shells embracing the cup-shaped ends and spun over the bearing rings to retain the bearing rings on the cup-shaped ends, said shells having slots therein receiving the reduced neck portions of the shank.

6. A socket assembly comprising a first cup-shaped member, an opposed second cup-shaped apertured member, and a cup-shaped shell embracing the first member and having an inturned side wall extending inwardly over the second member without closing the aperture thereof, said shell being effective to hold the first and second cup members in socket-defining opposed relation.

7. A ball socket comprising a first semi-ball shaped housing having a shank extending therefrom, an opposed second semi-ball shaped housing bottomed on said first housing, and a ball shaped slotted shell engaging both housings and receiving the shank therethrough.

BERNARD E. RICKS.

REFERENCES CITED

The following references are of record in the file of this patent:

UNITED STATES PATENTS

| Number | Name | Date |
| --- | --- | --- |
| 2,037,786 | Hufferd | Apr. 21, 1936 |
| 2,108,814 | Flumerfelt | Feb. 22, 1938 |
| 1,917,502 | Crawford | July 11, 1933 |
| 2,025,727 | Crawford | Dec. 31, 1935 |
| 1,428,024 | Garman | Sept. 5, 1922 |
| 799,176 | Marble et al. | Sept. 12, 1905 |

FOREIGN PATENTS

| Number | Country | Date |
| --- | --- | --- |
| 575,296 | Germany | Apr. 27, 1933 |